(12) United States Patent
Low et al.

(10) Patent No.: US 8,484,456 B2
(45) Date of Patent: Jul. 9, 2013

(54) TRUSTED ELECTRONIC MESSAGING SYSTEM

(75) Inventors: Sydney Gordon Low, Kew (AU); Matthew Iain Walker, Heidelberg Heights (AU)

(73) Assignee: Alien Camel Pty Ltd., Kew, Victoria (AU)

( * ) Notice: Subject to any disclaimer, the term of this patent is extended or adjusted under 35 U.S.C. 154(b) by 420 days.

(21) Appl. No.: 11/296,868

(22) Filed: Dec. 8, 2005

(65) Prior Publication Data

US 2006/0143136 A1    Jun. 29, 2006

Related U.S. Application Data

(60) Provisional application No. 60/634,078, filed on Dec. 8, 2004.

(30) Foreign Application Priority Data

Dec. 8, 2004 (AU) .............................. 2004907033

(51) Int. Cl.
| | |
|---|---|
| *H04L 29/06* | (2006.01) |
| *G06F 11/30* | (2006.01) |
| *G06F 12/14* | (2006.01) |
| *G06F 12/16* | (2006.01) |
| *G06F 9/00* | (2006.01) |

(52) U.S. Cl.
USPC ............ 713/152; 713/153; 713/162; 713/188; 726/1; 726/4; 726/14; 726/22; 726/23; 726/24; 705/64

(58) Field of Classification Search
USPC ......... 713/153, 152, 162, 188; 705/64; 726/1, 726/4, 14, 22, 23, 24
See application file for complete search history.

(56) References Cited

U.S. PATENT DOCUMENTS

| | | | | |
|---|---|---|---|---|
| 6,584,564 | B2 * | 6/2003 | Olkin et al. | 713/152 |
| 6,654,787 | B1 * | 11/2003 | Aronson et al. | 709/206 |
| 7,127,741 | B2 * | 10/2006 | Bandini et al. | 726/14 |
| 7,231,427 | B1 * | 6/2007 | Du | 709/206 |
| 2002/0016824 | A1 * | 2/2002 | Leeds | 709/207 |
| 2002/0138581 | A1 * | 9/2002 | MacIntosh et al. | 709/206 |
| 2003/0046533 | A1 * | 3/2003 | Olkin et al. | 713/152 |
| 2003/0231207 | A1 * | 12/2003 | Huang | 345/752 |
| 2004/0019780 | A1 * | 1/2004 | Waugh et al. | 713/152 |
| 2004/0054886 | A1 * | 3/2004 | Dickinson et al. | 713/153 |
| 2004/0243832 | A1 * | 12/2004 | Wilf et al. | 713/200 |
| 2005/0097174 | A1 * | 5/2005 | Daniell | 709/206 |
| 2005/0120118 | A1 * | 6/2005 | Thibadeau | 709/228 |
| 2005/0198518 | A1 * | 9/2005 | Kogan et al. | 713/188 |
| 2005/0210106 | A1 * | 9/2005 | Cunningham | 709/206 |
| 2005/0257261 | A1 * | 11/2005 | Shraim et al. | 726/22 |
| 2006/0031313 | A1 * | 2/2006 | Libbey et al. | 709/206 |

* cited by examiner

*Primary Examiner* — Edan Orgad
*Assistant Examiner* — Kari Schmidt
(74) *Attorney, Agent, or Firm* — Nixon & Vanderhye PC

(57) ABSTRACT

An electronic messaging system, including: a first message transfer server for receiving a message for a party, mapping the destination address of the message to a trusted address for the party, and substituting the trusted address for the destination address; and a second message transfer server for establishing an authenticated transport session with the first message transfer server to receive the message and transfer the message to a location corresponding to the trusted address.

40 Claims, 6 Drawing Sheets

TRUSTED ELECTRONIC MESSAGING SYSTEM

This application claims benefit of U.S. Provisional Application No. 60/634,078, filed Dec. 8, 2004, and AU Provisional Application No. 2004 907033, filed Dec. 8, 2004. The entire contents of each of these applications are incorporated herein by reference.

FIELD

The present invention relates to an electronic messaging system and process that may be used for sending an electronic message, such as an email, to a trusted address.

BACKGROUND

The absence of any true centralised control of the Internet, and the open nature of the protocols that support it, are characteristics that have lead to its rapid adoption, but also have given rise to considerable abuse and fraud. This is acutely illustrated in use of the network to send unsolicited messages whilst masking or "spoofing" the identity of the sender. For example, protocols, such as SMTP, that allow the transmission of emails between computers on the Internet, allow messages to be sent with headers, such as in the "from" field, that do not provide an indication as to the true location from which the emails have been sent and often do not represent a valid return address. This allows parties who send unsolicited emails, most of which are commonly referred to as "Spam", to remain fictitious and anonymous. Another significant problem is spoofing of emails so as to represent the message as coming from another party, such as a financial institution or a reputable ecommerce site, and soliciting the entry of personal information and account details. This type of spoofing scam is considerably more serious and is known as "phishing". A number of banks, such as Citigroup, Lloyds, TSB, Barclays, the Bank of America, and the ANZ Bank of Australia, have been the subject of phishing attacks where emails have been sent which appear to have come from the banks and request customer account, debit and credit card data.

A number of developments have been introduced and proposed to address the problems posed by the unsolicited and fraudulent messages currently being sent. For example, software has been developed by a number of parties to filter Spam received by email clients. The filters may be installed on a client machine or a receiving mail server (which may be maintained by an Internet service provider (ISP) or within a local area network). Whilst the Spam filters are successful to a certain degree, and are able to eliminate a relatively high percentage of Spam, a filter is yet to be produced that is able to eliminate all unsolicited email without also filtering valid messages.

Systems have also been developed to certify an email as being authentic or valid, primarily on the basis of authenticating or verifying the sender. Most email clients, such as Microsoft Outlook Express, Microsoft Outlook 2000 and Apple's Mail.app application, support the S/MIME (Secure/Multipurpose Internet Mail Extensions) standard which provides a protocol that enables digital signatures, certificates and encryption to be added to the MIME format. This allows senders of emails to digitally sign their emails so that they can be authenticated and verified by a receiver. This facility, however, is under utilized by users of email clients, and unfortunately is also open to abuse. The emails can be signed with a digital certificate obtained from a certification authority ("CA"), such as VriSign Corporation. Whilst some CAs apply rigorous processes concerning determining the identity of parties requesting a digital certificate, others unfortunately do not. For example, a personal email digital certificate can be obtained from Thawte Technologies Inc. using a relatively simple procedure without any offline verification.

Another significant problem in sending digitally signed emails in large corporations is managing the security and safeguarding of the digital certificates. Typically, the sender of an email requires the certificate to be stored on his computer. This poses serious security issues if the computer is stolen or the certificate is improperly copied and used by another email sender. Furthermore, in many situations such as centralised call centres, many computer operators may send emails with the same email address, eg support@company.com. For all these emails to be digitally signed, each computer requires a copy of the digital certificate, thereby increasing the risk of certificate theft or loss.

Furthermore, the manner in which the current email clients indicate that an email has been digitally signed is by the display of a seal logo that most users either neglect, ignore or are unaware of what it represents. The seal logo needs to be clicked on by the recipient of an email to display information on the owner of the digital signature that sent the email and any certificate used when signing the email.

A number of solutions have been proposed to address phishing, such as those proposed by the Anti-Phishing Working Group. These include providing web site authentication using physical tokens (such as a smart card), using client software to verify the authenticity of web sites, and digitally signing all emails using S/MIME, as discussed above. For the latter approach, the digitally signed emails will be either verified by the client or a gateway using the standard processes for the S/MIME standard. All of these approaches suffer the difficulties discussed above, are impractical to implement or do not provide a solution for recipients of emails to determine whether they can trust the origin or the content of an email they receive as being authentic or indeed having really been sent by the sender identified. Accordingly, it is desired to address this or at least provide a useful alternative.

SUMMARY

In accordance with the present invention there is provided an electronic messaging system, including:
  a first message transfer server for receiving a message for a party, and including a message module for mapping the destination address of said message to a trusted address for said party, and substituting said trusted address for said destination address; and
  a second message transfer server for establishing an authenticated transport session with said first message transfer server to receive said message, and transfer said message to a location corresponding to said trusted address.

The present invention also provides an electronic messaging system, including:
  a message transfer server for receiving a message for a party, and translating the destination address of said message to a trusted address for said party, and sending said message to a trusted domain corresponding to the trusted address using an authenticated transport session.

The present invention also provides an electronic messaging system, including:
  a message transfer server for establishing an authenticated transport session to receive a message for a trusted address, and for receiving said message and storing the message in a message folder for said trusted address.

The present invention also provides a client message interface for accessing received messages, including at least one trusted message folder for messages received for a trusted address and sent using an authenticated transport session.

The present invention also provides an electronic messaging process, including:

processing a message for a customer, mapping data for said customer to a trusted destination address for inclusion in said message, and establishing an authenticated transport session with a message transfer server to send said message to said trusted address.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
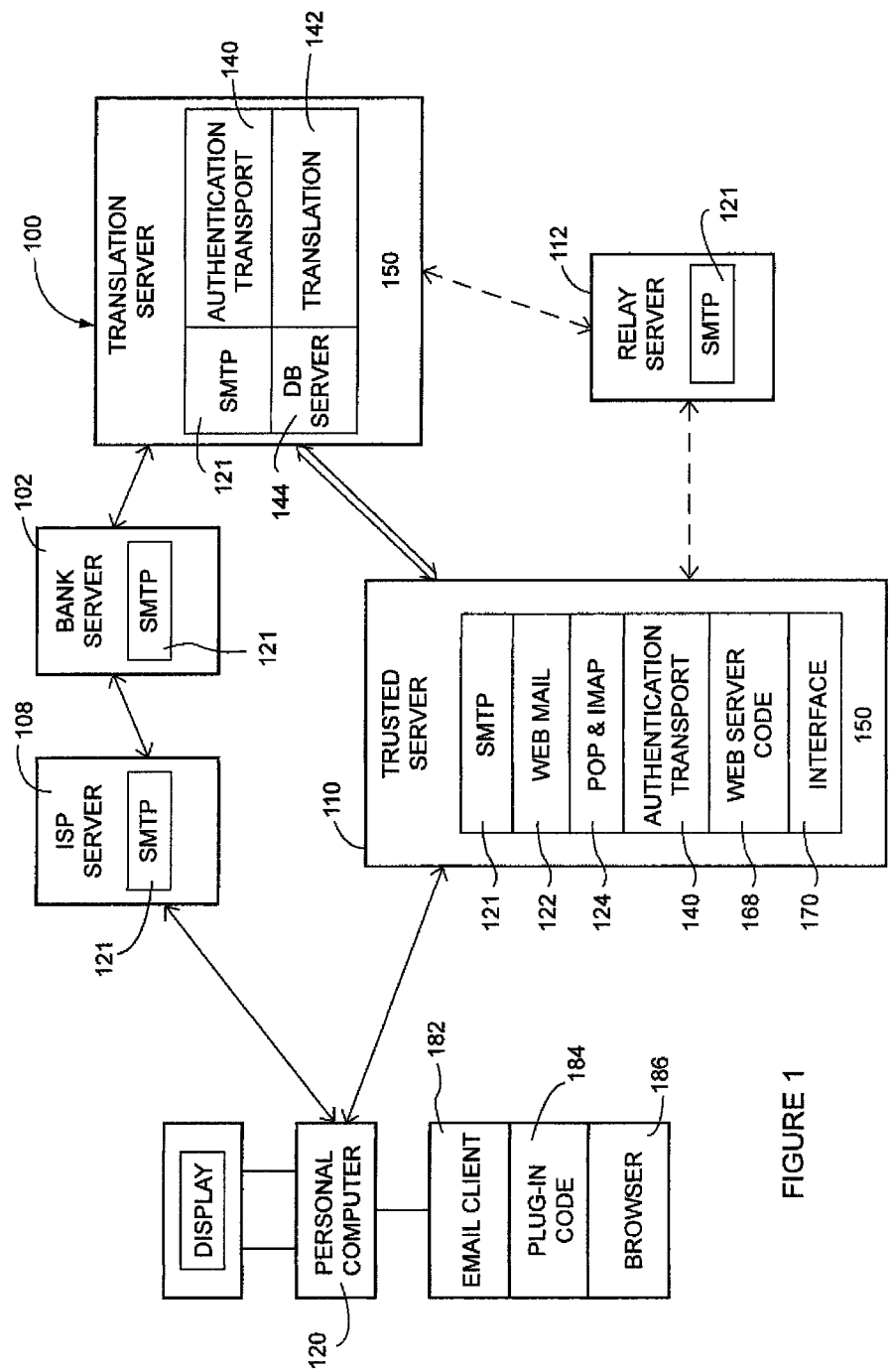
FIG. 1 is a block diagram of a preferred embodiment of a trusted electronic messaging system.

A trusted electronic messaging system, as shown in FIG. 1, includes a translation server 100 and a trusted server 110. The translation server 100 is able to communicate with other electronic messaging servers 102, 108 and 112 over a communications network. The translation server operates to receive all messages that are required to be sent in a trusted manner sent from at least one designated server 102, which may be in reply to messages received from a number of different servers 108. The translation server 100 translates or maps the destination addresses of the messages from general domains to a predetermined domain, such as a trusted domain that includes the trusted server 110. The trusted server 110 enables the messages sent to the domain to be received by a user using a client device 120. The messages sent to the trusted domain of the trusted server 110 are sent using a trusted or authenticated transport process, which may be via other equipment, such as a relay server 112 that digitally signs emails.

For the purposes of this description, the servers 100 to 112 are all described as being SMTP (Simple Mail Transfer Protocol) servers, and the client device 120, a personal computer running an email client 182, such as Microsoft Outlook or Apple Mail email software. The email client 182 may be further enhanced by plugin code 184, as discussed below. It will of course be appreciated that the servers 100 to 112 could be other messaging servers, such as short message service (SMS) servers, and the client device 120 could be another computer device, such as a mobile phone or PDA. The communications network is therefore described as being the Internet and as using the various Internet protocols, such as SMTP, POP and IMAP and S/MIME.

The SMTP servers 100 to 112 each include a mail transfer application 121, such as Sendmail or Microsoft Exchange, to implement SMTP. The trusted server 110 also includes mail server software 124, such as Cyrus or Microsoft Exchange, to implement POP and IMAP. The trusted server 110 further includes web server software 122, such as Apache, and associated code 168 to provide a web mail server and allow the client machine 120 to access messages using an Internet browser 186. Web mail servers are used by mail providers such as Microsoft Corporation and Yahoo Inc. to offer users an email service accessible via a web browser. Additional functionality can be provided with an interface module 170, discussed below.

The translation server 100 and the trusted server 110 include an authentication transport module 140 that performs an authentication process to enable the servers 100 and 110 to establish an authenticated transport session, as discussed below. The translation server 100 has a translation module 142 to perform a message translation process, and is part of another network domain, hereinafter referred to as the translation domain, or simply another IP address of the current network. The authentication transport module 140 and the translation module 142 include computer program instructions provided by software in program languages, such as Java and Perl. The translation server 100 has a database server 144 provided using software, such as MySQL4. The software modules 121 to 170 are all run on an operating system, such as the Linux OS, on a standard computer 150, such as a PC server having various required hardware components such as non-transitory computer memory media (eq magnetic and/or silicon-based memory devices) for storage of computer program modules to be executed by the servers. As will be understood by those skilled in the art, the components 121 to 170 of the servers can also be placed on a number of distributed computers connected by the communications network, and the processes executed by the components can also be executed at least in part by dedicated hardware circuits, eg ASICs. For example, the SMTP server 102, utilized by an entity to communicate with other parties, can be combined with the translation server 100 onto a single computer. Similarly, the processes executed by the components 182 to 186 can also be executed at least in part by dedicated hardware circuits, eg ASICs.

The relay server 112 can be optionally used to digitally sign email messages between the translation server 100 and the trusted server 110. The relay server 112 is described in the specifications of International Patent Application PCT/AU2005/000560 (WO 2005/104422) ("the relay patent specification").

The translation server 100 is normally deployed in the premises of and for use by an entity or an organisation, such as a bank, so that the entity can ensure that all messages sent to its customers are passed by an authenticated transport session to the domain of the trusted server 110. Customers, on being made aware of the trusted messaging system being used by the entity, are then assured and confident that any messages for them collected from the trusted server 110 using their client device 120 are valid messages from the entity that have not been forged by another party.

The entity's SMTP server 102 handles the transfer of emails for the organisation. These may be emails generated within the organisation, individually or in bulk for customers. The emails may also be generated in reply to an email received from a customer via an Internet service provider (ISP) SMTP server 108. For example, a customer using a client device 120 may send an email to a bank which is received by the bank server 102 via the ISP server 108. A customer service representative may then generate an email in reply using a standard email client. This email may be, for example, from tom@bank.com.au back to john@isp.com, the recipient or destination address being the sender address of the originally received email from the customer. Once the reply email is generated and sent using the bank email client, it is received by the bank SMTP server 102 and would normally be simply transferred, using the standard Internet protocols, back to the customer via the ISP server 108 on which the customer's mail account is maintained. The translation server 100, however, has been installed and an SMTP process executed by the translation server 100 waits for email being sent by the SMTP server 102. The network settings for the SMTP server 102 are set so at least all emails required to be sent in a trusted manner from the bank SMTP server 102 are sent to the translation server 100. The emails sent to the translation server 100 are determined based on mail routing rules provided on the SMTP server 102 and configured by the bank. For example, all outgoing emails may be sent or emails chosen based on destination IP address, source address or customer characteristics, etc. The translation server 100 examines the emails and determines whether a trusted email address should be substituted for each email.

Figure 2:
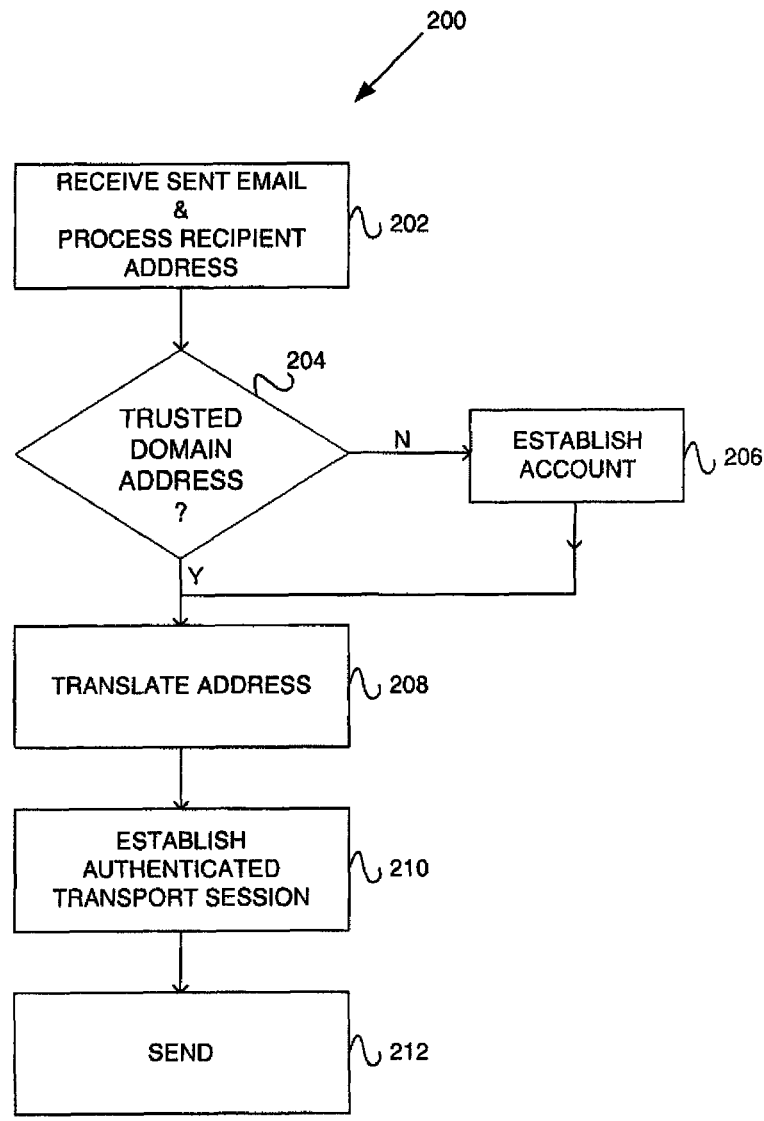
FIG. 2 is a flow diagram of a translation process performed by a translation server of the system.

The translation server 100 receives emails sent by the bank server 102 under the control of the translation module 142. The translation server 100 performs a translation process 200, as shown in FIG. 2, where the translation module 142 on detecting that an email has been received, parses the email so as to extract at least the recipient, or destination address(es) (202) and any other data required. The translation module 142 determines whether the email needs to be translated or modified, or simply deleted, rejected or sent as is. The recipient address(es) is used by the database server 144 to query a database of customers to locate a trusted address corresponding to the recipient address (204). The trusted address is for a trusted domain, which may, for example, have a domain name of "trustedmailbox.com". If the database query returns that a trusted domain address does not exist corresponding to the recipient address, then the translation server 100 performs steps to establish a mail account for the customer in the trusted domain (206). This may be automatically established by communication with the trusted server 110, and then the customer advised by a separate communication mechanism, such as telephone, mail, fax, email or SMS message, depending on contact details maintained for the customer. For example, the entity may automatically create an account and email the customer an invitation to activate. Alternatively, the customer is contacted using the separate communication mechanism to provide the content of the email and invite the customer to establish an account in the trusted domain. If the customer does, however, have a corresponding trusted domain address, eg john@trustedmailbox.com, then the email is further processed so as to translate or replace the recipient address, eg john@isp.com, with the trusted domain address, eg john@trustedmailbox.com (208). Once the email has been processed and a trusted address substituted by the translation module 142, the authentication module 140 operates to establish an authenticated transport session with the trusted server 110 of the trusted domain, either directly or via the relay server 112 (210). The authenticated transport session is established, as described in the relay server specification, by using one or more of the following:

(i) A transport certificate provided to the sending server 110. The transport certificate is a X.509 digital certificate used when connecting the servers 100 and 110 using the Transport Layer Security (TLS) protocol, as specified in RFC 2246. The certificate complies with the ITU-Standard X.509 for public key infrastructure and can be as specified in RFC 2459. The certificate is issued using a secure identification verification process, as discussed in the relay patent specification.

(ii) A username and password for the entity for connecting the SMTP server 100 to the trusted server 110 using the SMTP AUTH extension to the SMTP protocol, as specified in RFC2554 SMTP Service Extension for Authentication to authenticate the transport session.

(iii) A secret token provided to the message transport entity for use in the email headers of the sent emails so that the received emails can be authenticated, as described in the relay patent specification.

(iv) A hash process based on the content of the email excluding variable content, such as first names and last names, as discussed in the relay patent specification.

(v) A virtual private network (VPN) tunnel between the servers 100 and 110.

Once the authenticated transport session has been established, the email is sent to the trusted domain (212).

Figure 3:
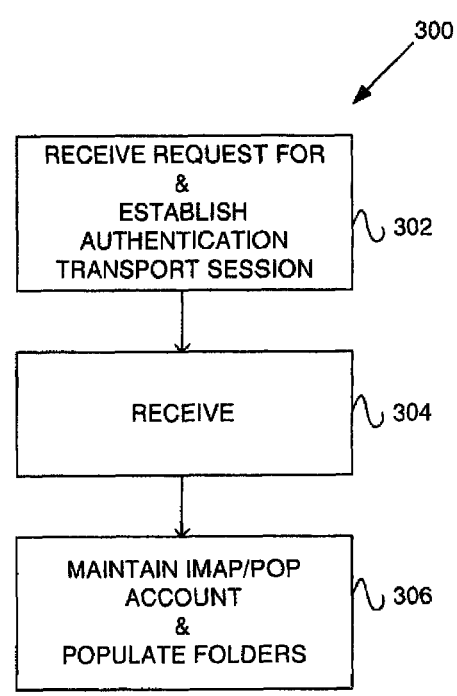
FIG. 3 is a communication process performed by a trusted server of the system.
Figure 4:
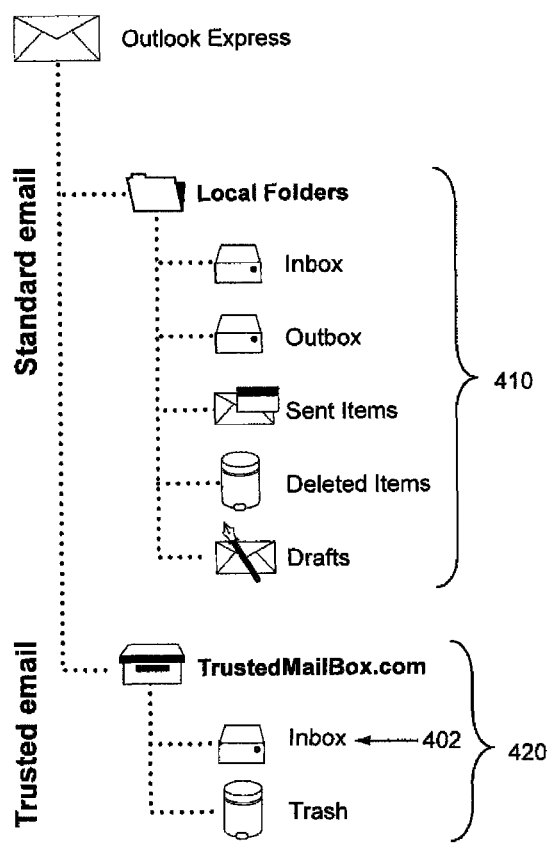
FIGS. 4, 5, and 6 are schematic diagrams of mail interfaces generated on a client device of the system.
Figure 5:
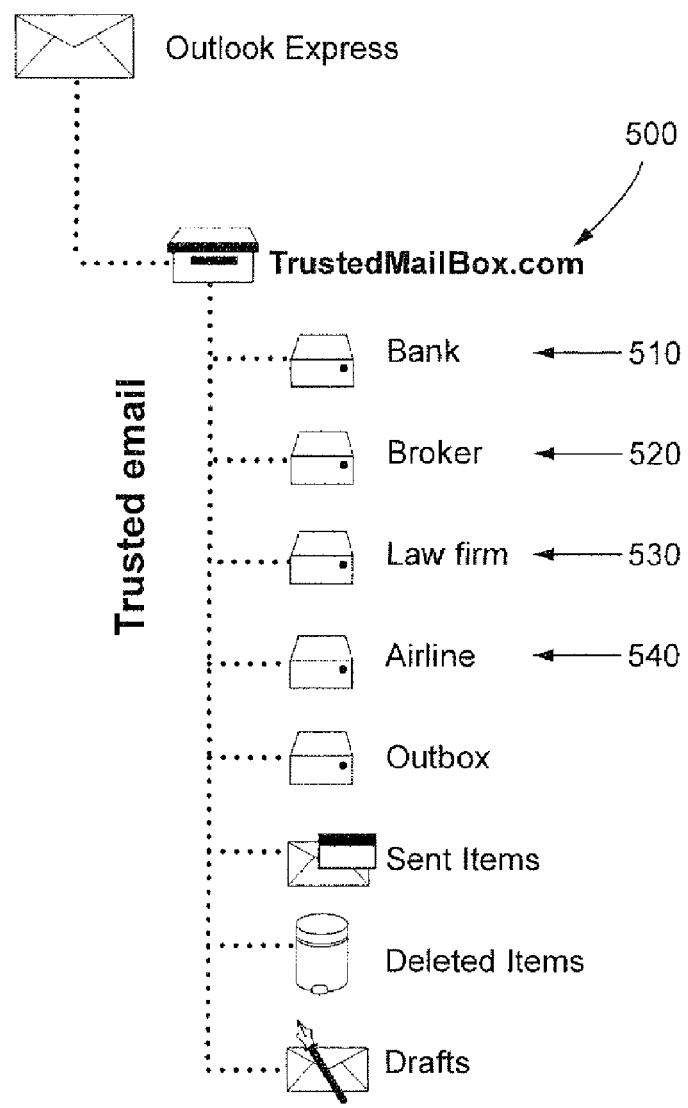
Figure 6:
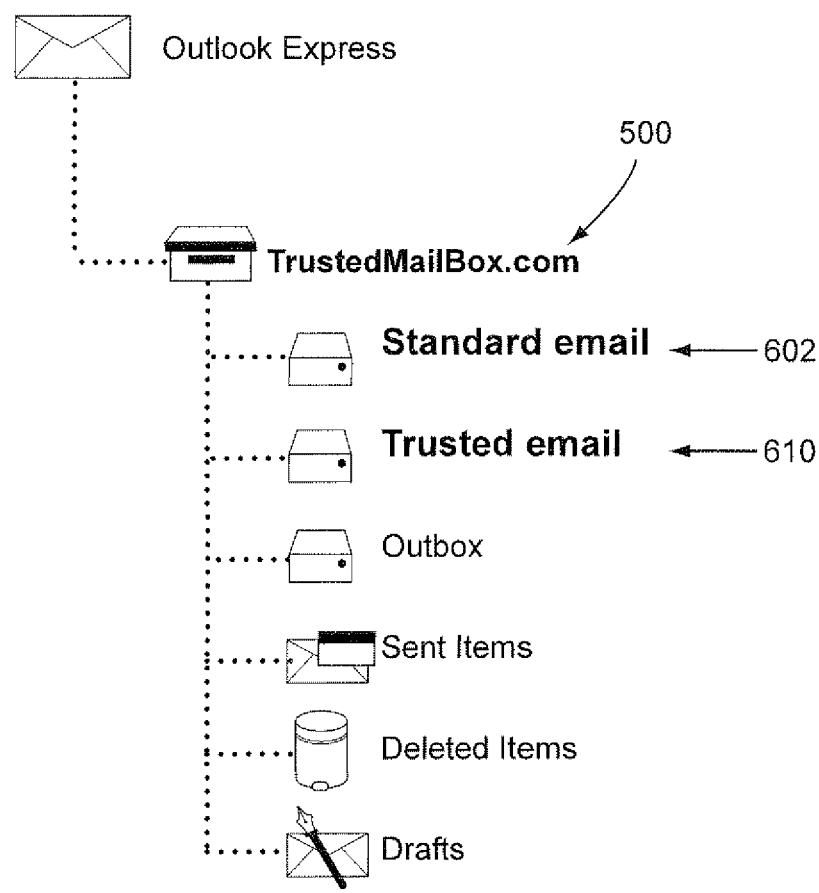

The trusted server 110 performs a communication process (300), as shown in FIG. 3. The server 110 uses its authentication module 140 to process a request for and then communicate with another server 100 to establish an authenticated transport session (302), as discussed above. Once the authenticated transport session is established, the trusted server is able to receive emails from the translation server 100 (304). Once the mail transfer application 121 has received an email, the email can be retrieved by the customer using the POP/IMAP mail server software 124 or the web mail server software 122, 168 executed by the trusted server 110 (step 306). The trusted server uses the mail server software to maintain and provide access to an email account for the customer in the trusted domain. For example, as shown in FIGS. 4, 5 and 6, the web mail server or the IMAP server software 122, 124, 168, 170 can be used to allow the customer using the client device 120 to generate a user interface for the mail accounts that clearly distinguishes between the user's standard email accounts and any trusted accounts, such as the trustedmailbox.com account, maintained for emails sent by an entity, such as a bank.

If the translation server 100 is not located on the same network as the entity's SMTP server 102 it may be necessary to establish an authenticated transport session, using an authentication module 140 that would be incorporated into the entity's SMTP server 102, with the translation server 102 using the authentication module 140 of the translation server 102.

The translation server 100 may also interact with multiple trusted servers 110. In this case an entity, such as a bank, may have endorsed multiple trusted domains and trusted servers and the translation server will perform the required translation from a standard address to a trusted address and transmit the message to the appropriate trusted server.

For multiple entities having SMTP servers 102 and corresponding translation servers 100, the database server 144 may be separated from the translation servers 100 so the translation servers 100 can issue a database query across a communications network to the database server 144.

With reference to FIG. 4, the client device 120 has Outlook Express as the email client 182, and this is used to access a standard POP account maintained by the user's ISP 108. The trusted server 110 stores emails received on the users trusted email address in an IMAP inbox folder 402. Emails from the user's ISP 108 are downloaded and stored on the user's computer 120 and retrieved by the email client 182 and accessible via local folders 410. The local folders 410 for standard email are clearly distinguished from the IMAP folders 420 for the email sent to the trusted address of the trusted domain. The email client 182 is able to generate the interface shown in FIG. 4 by communicating with the ISP 108 or the trusted server 110.

The trusted server 110, as shown in FIG. 5, is able to maintain different folders or mailboxes for trusted email received for the user from different entities. For example, inbox folders 500 may be maintained for trusted emails sent by different entities, i.e. the user's bank 510, sharebroker 520, law firm 530 or favoured airline 540. The user may have a different trusted address for each of the entities, or alternatively the trusted server 110 determines which folder a received trusted email should be stored in on the basis of the sender address or other trusted data, such as a S/MIME certificate. The alternative is particularly advantageous, as the user may only need to maintain a single account with the trusted server 110, and only have a single trusted address which is used by all of the different entities. The interface module 170 of the trusted server 110 is also able to apply access permissions to the folders 500 of the account on the basis of access permission data stored for the user. The access permission data may be different for each of the different folders 510 to 540. The access permission data may define the extent to which a user can handle the messages stored in the folders 500 of the trusted domain. For example, restrictions may be placed on the ability to edit, move, create or delete emails. The access permissions may be determined by the entities associated with the folders 510 to 540. In particular messages created in the folders 500 are only created by the trusted server, based on the trusted information determined from the authenticated transport session.

The trusted server 110 can also be used to receive emails in a standard manner, i.e. not via an authenticated transport session. Any emails received for the user at the trusted address by the trusted server, that have not entered the domain in the trusted manner, i.e. using the authenticated transport session, are placed in a different folder 602, to that of a trusted email 610, as shown in FIG. 6. This allows an operator of the trusted server 110 to accept a standard email for the user, if desired. The operator of the trusted server 110 can reject email that asserts it is from one of the trusted entities but does not enter the domain in the trusted manner.

The email client plugin 184 or the interface module 170 can also be used to enhance the client interface to display particular authentication messages for the emails received from the bank, or render the folders for the different accounts using a variety of display formats so as to provide further distinction between the accounts.

The trusted electronic messaging system, as described above, ensures that any emails sent by an entity, such as a bank, financial institution or utility, is sent to an email service and domain that the entity's customers can trust and be assured that all emails sent to such a trusted location have been securely delivered by the entity. This includes any emails that are sent in reply to messages sent by the customers. The location or trusted inbox can be trusted because only authorised entities (such as a bank) can establish an authenticated transport session with the trusted server of the trusted domain to transmit emails to the trusted server, and only the trusted server can place emails in the location.

Many modifications will be apparent to those skilled in the art without departing from the scope of the present invention as herein described with reference to the accompanying drawings.

What is claimed is:

1. An electronic message system, said system comprising:
 a first message transfer server configured to communicate with equipment of an authorized identifiable entity to receive a message for a party to be sent in a trusted manner, and including:
   (i) a message module configured to map the destination address of said message to a trusted address for said party, and substituting said trusted address for said destination address in said message to cause said message to be routed to a trusted and different folder of said party to indicate said message was sent in a trusted manner and to indicate the message came from said authorized identifiable entity; and
   (ii) an authenticated transport module configured to establish an authenticated transport session for sending messages to said trusted address whereby the trusted address is used in an authenticated transport session;
 and a second message transfer server including an authenticated transport module configured to establish said authenticated transport session with said first message transfer server to receive said message, and transfer said message to the trusted folder corresponding to said trusted address, said trusted folder containing only messages received via an authenticated transport session in a trusted manner from said authorized identifiable entity;
 wherein said message in said trusted folder can be trusted by a recipient as being from the authorized identifiable entity.

2. An electronic messaging system as claimed in claim 1, wherein said message is a reply message generated in reply to a message from the destination address.

3. An electronic messaging system as claimed in claim 1, wherein said trusted address corresponds to a trusted domain including the second message transfer server.

4. An electronic messaging system as claimed in claim 3, wherein the trusted domain provides a mail account corresponding to the trusted address for the party.

5. An electronic messaging system as claimed in claim 4, wherein the second message transfer server includes an email transfer component allowing said mail account to be accessed using an Internet protocol.

6. An electronic messaging system as claimed in claim 4, wherein the second message transfer server includes a web server and a web mail server component allowing the mail account to be accessed using an Internet protocol.

7. An electronic messaging system as claimed in claim 1, wherein said authenticated transport session is a transport layer security (TLS) session.

8. An electronic messaging system as claimed in claim 1, wherein said authenticated transport session is an SMTP AUTH session.

9. An electronic messaging system as claimed in claim 1, wherein said authenticated transport session is established using an exchange of authentication code between said servers, such a username password combination, a unique token or hash code.

10. An electronic messaging system as claimed in claim 1, including an entity message server configured to route predetermined messages to said first message transfer server.

11. An electronic messaging system, said system comprising:
 a message transfer server configured to communicate with equipment of an authorized identifiable entity to receive a message for a party to be sent in a trusted manner, and to map a destination address of said message to a trusted address for said party and substitute said trusted address for said destination address in said message to cause said message to be routed to a trusted and different folder of said party to indicate said message was sent in a trusted manner and to indicate the message came from said authorized identifiable entity, said message transfer server including an authenticated transport module configured to establish an authenticated transport session with a server of a trusted domain; and wherein said trusted address is used in the authenticated transport session to send said message to the trusted folder of said trusted domain corresponding to the trusted address using said authenticated transport session;

wherein said trusted folder contains only messages received via an authenticated transport session in a trusted manner from said authorized identifiable entity and therefore said message in said trusted folder can be trusted by a recipient as being from the authorized identifiable entity.

12. An electronic messaging system as claimed in claim 11, wherein said message transfer server includes a translation module to determine when said trusted email address is to be substituted and performs said address substitution.

13. An electronic messaging system as claimed in claim 12, wherein said message transfer server includes a database server, and said translation module parses the message and accesses the database server on the basis of data extracted from the message to determine processing to be performed on the message, including at least one of (a) editing, (b) deleting or (c) substituting the trusted address for a recipient address of the message.

14. An electronic messaging system as claimed in claim 11, wherein said authenticated transport session is a transport layer security (TLS) session.

15. An electronic messaging system as claimed in claim 11, wherein said authenticated transport session is an SMTP AUTH session.

16. An electronic messaging system as claimed in claim 11, wherein said authenticated transport session is established using an exchange of authentication code between said servers, such a username password combination, a unique token or hash code.

17. An electronic messaging system including a message transfer server as claimed in claim 11.

18. An electronic messaging system as claimed in claim 17, wherein said authenticated transport session is a transport layer security (TLS) session.

19. An electronic messaging system as claimed in claim 17, wherein said authenticated transport session is an SMTP AUTH session.

20. An electronic messaging system as claimed in claim 17, wherein said authenticated transport session is established using an exchange of authentication code between said servers, including at least one of (a) a username password combination, (b) a unique token or (c) hash code.

21. An electronic messaging system as claimed in claim 17, including an entity message server configured to route predetermined messages to said message transfer server.

22. An electronic messaging system, comprising:

a message transfer server including an authenticated transport module configured to establish an authenticated transport session with another message transfer server in communication with equipment of an authorized identifiable entity to receive a message for a party to be sent in a trusted manner for a trusted address to cause said message to be routed to a trusted and different folder of said party to indicate said message was sent in a trusted manner and to indicate the message came from said authorized identifiable entity wherein the trusted address is used in the authenticated transport session, and for receiving said message and storing the message in the trusted message folder for said trusted address, said trusted message folder containing only messages received via an authenticated transport session in a trusted manner from said authorized identifiable entity, the trusted address having been previously mapped to, and substituted into the message for, an initial destination address for said message;

wherein said message in said trusted folder can be trusted by a recipient as being from said authorized identifiable entity.

23. An electronic messaging system as claimed in claim 22, wherein said server maintains a plurality of trusted message folders for said trusted address, said folders being for respective sending or originating addresses or domains.

24. An electronic messaging system as claimed in claim 23, wherein said server, based on authentication data determined establishing the authenticated transport session, is uniquely able to store messages in the respective trusted message folders for said sending or originating addresses or domains.

25. An electronic messaging system as claimed in claim 23, wherein said folders are for respective entities.

26. An electronic messaging system as claimed in claim 22, wherein the server maintains at least one folder for messages sent to non-trusted addresses or domains.

27. An electronic messaging system as claimed in claim 22, wherein said server maintains folders for messages sent to said trusted address using said authenticated transport session, and messages are sent to said trusted address using an unauthenticated transport session.

28. An electronic messaging system as claimed in claim 22, wherein said server maintains access permission data defining handling of messages in said folder by a recipient.

29. An electronic messaging system as claimed in claim 22, wherein said server includes an email transfer component, and an email server component establishing said folder.

30. An electronic messaging system as claimed in claim 22, wherein said transfer server includes a web server and a web mail server and an interface module processing said message and maintaining said folder.

31. A client message interface configured to access received messages, said interface including a programmed computer with a non-transitory computer-readable memory medium containing at least one trusted message folder storing messages received for a trusted address and sent using an authenticated transport session, the trusted address having been previously mapped to, and substituted into the messages for, an initial destination address for said messages, wherein said trusted address corresponds to a trusted domain including a message transfer server configured to (a) establish said authenticated transport session with an address translation server communicating with equipment of an authorized identifiable entity to receive a message for a party to be sent in a trusted manner to cause said message to be routed to a trusted and different folder of said party to indicate said message was sent in a trusted manner using the authenticated transport session and to indicate the message came from said authorized identifiable entity, and (b) receive and store said messages in said at least one message folder wherein the trusted address is used in an authenticated transport session, the trusted message folder containing only messages received via an authenticated transport session in a trusted manner from said authorized identifiable entity;

wherein said message in said trusted folder can be trusted by a recipient as being from said authorized identifiable entity.

32. A client message interface as claimed in claim 31, wherein access to said at least one trusted message folder is defined by server access permission data.

33. An electronic messaging process, said process comprising using at least one programmed computer having a non-transitory computer-readable memory medium and input/output ports communicating with at least one communication network to:
- communicate with equipment of an authorized identifiable entity to receive a message for a party to be sent in a trusted manner;
- process a message for a customer by mapping a destination address for said customer to a trusted address for said party and substituting said trusted address for said destination address in said message to cause said message to be routed to a trusted and different folder of said party to indicate said message was sent in a trusted manner and to indicate the message came from said authorized identifiable entity and by establishing an authenticated transport session with a message transfer server to send said message to the trusted folder corresponding to said trusted address wherein the trusted address is used in the authenticated transport session, the trusted folder containing only messages received via an authenticated transport session in a trusted manner from said authorized identifiable entity;
- wherein said message in said trusted folder can be trusted by a recipient as being from said authorized identifiable entity.

34. An electronic messaging process as claimed in claim 33, wherein said message is a reply message generated in reply to a message from the destination address.

35. An electronic messaging process as claimed in claim 33, wherein said trusted address corresponds to a trusted domain including said message transfer server.

36. An electronic messaging process as claimed in claim 35, wherein the trusted domain provides a mail account corresponding to the trusted address for the party.

37. An electronic messaging process as claimed in claim 33, wherein said authenticated transport session is a transport layer security (TLS) session.

38. An electronic messaging process as claimed in claim 33, wherein said authenticated transport session is an SMTP AUTH session.

39. An electronic messaging process as claimed in claim 33, wherein said authenticated transport session is established using an exchange of authentication code with said server, including at least one of (a) a username password combination, (b) a unique token or (c) hash code.

40. An electronic messaging process as claimed in claim 33, wherein said translating includes parsing the message and accessing a database server on the basis of data extracted from the message to determine processing to be performed on the message, including at least one of (a) as editing, (b) deleting or (c) substituting the trusted address for a recipient address of the message.

* * * * *